US009503475B2

United States Patent
Fadida et al.

(10) Patent No.: US 9,503,475 B2
(45) Date of Patent: *Nov. 22, 2016

(54) SELF-ADAPTIVE AND PROACTIVE VIRTUAL MACHINE IMAGES ADJUSTMENT TO ENVIRONMENTAL SECURITY RISKS IN A CLOUD ENVIRONMENT

(75) Inventors: Itzhak Fadida, Silver (IL); Nir Barak, Yosef (IL); Eitan Hadar, Nesher (IL)

(73) Assignee: CA, Inc., New York, NY (US)

(*) Notice: Subject to any disclaimer, the term of this patent is extended or adjusted under 35 U.S.C. 154(b) by 318 days.

This patent is subject to a terminal disclaimer.

(21) Appl. No.: 13/585,288

(22) Filed: Aug. 14, 2012

(65) Prior Publication Data

US 2014/0053226 A1   Feb. 20, 2014

(51) Int. Cl.
- *G06F 21/57* (2013.01)
- *H04L 29/06* (2006.01)
- *H04L 29/08* (2006.01)

(52) U.S. Cl.
CPC ........... *H04L 63/20* (2013.01); *H04L 63/1408* (2013.01); *H04L 67/34* (2013.01)

(58) Field of Classification Search
CPC ................. H04L 63/20; H04L 63/1408; H04L 67/34
See application file for complete search history.

(56) References Cited

U.S. PATENT DOCUMENTS

| | | | | |
|---|---|---|---|---|
| 7,904,940 B1 * | 3/2011 | Hernacki | ............... | G06F 21/57 726/1 |
| 8,065,712 B1 * | 11/2011 | Cheng | ................... | H04L 63/105 726/1 |
| 8,612,566 B2 * | 12/2013 | Ferris | .................... | G06F 15/177 709/222 |
| 8,612,577 B2 * | 12/2013 | Ferris | .................... | G06F 9/5066 709/224 |
| 8,621,553 B2 * | 12/2013 | Syed | ....................... | G06F 21/53 713/151 |
| 8,813,240 B1 * | 8/2014 | Northup | ................ | G06F 21/554 726/22 |
| 8,850,587 B2 * | 9/2014 | Nair | ........................ | G06F 21/57 709/223 |
| 2008/0046960 A1 * | 2/2008 | Bade | ..................... | G06F 9/4856 726/1 |
| 2010/0217850 A1 * | 8/2010 | Ferris | ..................... | H04L 63/20 726/1 |

(Continued)

*Primary Examiner* — Brandon Hoffman
*Assistant Examiner* — Wasika Nipa
(74) *Attorney, Agent, or Firm* — Myers Bigel, P.A.

(57) ABSTRACT

A computer system includes a security coordinator configured to be communicatively coupled to a plurality of managed machines deployed in a same computing environment and managed by an environment manager. The security coordinator is configured to detect a security condition with respect to a first one of the managed machines, and to automatically initiate modification of a second one of the managed machines in the same computing environment responsive to detection of the security condition. The security coordinator is configured to initiate the modification of the second one of the managed machines prior to occurrence of a security condition therein and prior to action by the environment manager with respect to the second one of the managed machines in response to the detected security condition.

26 Claims, 6 Drawing Sheets

(56) References Cited

U.S. PATENT DOCUMENTS

| | | | |
|---|---|---|---|
| 2011/0247047 A1* | 10/2011 | Loureiro | H04L 63/20 |
| | | | 726/1 |
| 2013/0074181 A1* | 3/2013 | Singh | H04L 41/0668 |
| | | | 726/22 |
| 2013/0247133 A1* | 9/2013 | Price | G06F 21/577 |
| | | | 726/1 |

* cited by examiner

SELF-ADAPTIVE AND PROACTIVE VIRTUAL MACHINE IMAGES ADJUSTMENT TO ENVIRONMENTAL SECURITY RISKS IN A CLOUD ENVIRONMENT

BACKGROUND

The present disclosure relates to computing systems, and in particular to maintaining the security of computing systems in virtual operating environments.

Virtualized computing environments, also referred to as cloud computing systems or composite information technology systems, are used to provide computing resources to end users. In a cloud computing environment, the physical hardware configuration is hidden from the end user. Cloud computing systems may include servers, network storage devices, routers, gateways, communication links, software (e.g., applications, operating systems, web services, etc.), and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines or appliances, which are guest operating systems installed within a host system and an optional preset configuration and structure (e.g., combination of operating system and web server). A virtual machine (VM) can be a software implementation of a machine or computer that executes programs as would a physical machine, in a manner that is transparent to a user. Virtual machines are typically implemented with software emulation and/or hardware virtualization. A single hardware and/or software platform may host a number of virtual machines, each of which may have access to some portion of the platform's resources, such as processing resources, storage resources, etc.

Because cloud computing treats computer resources as remote services that are accessed by customers, and because the actual physical resources that are used to implement a cloud computing environment may be accessed by many different customers, security is an important aspect of cloud computing. In a cloud computing environment, different customers may have different security requirements, which may be implemented using different security policies. However, hosting applications that have different security requirements in a single cloud computing environment may raise additional security issues. For example, when highly secured systems are hosted along with lower security systems, an attacker may attempt to leverage the lower security system to gain access to the highly secured systems.

BRIEF SUMMARY

According to an embodiment described herein, a computer system includes a security coordinator configured to communicate with a plurality of managed machines deployed in a same computing environment. The security coordinator is configured to detect a security condition with respect to a first one of the managed machines, and to autonomously and automatically initiate modification of a second one of the managed machines in the same computing environment responsive to detection of the security condition at the first one of the managed machines. The security coordinator is configured to initiate the modification responsive to detection of the security condition prior to a response or action thereto by an environment manager with respect to the second one of the managed machines, where the environment manager is configured to manage the plurality of managed machines.

In an embodiment, the modification of the second one of the managed machines may be initiated by the security coordinator prior to occurrence of a security condition with respect to the second one of the managed machines. In an embodiment, the modification of the second one of the managed machines may be initiated by the security coordinator by a control process that is independent of the environment manager.

In an embodiment, the security condition may be (or may otherwise indicate) a noncompliance with a security policy of the first one of the managed machines.

In an embodiment, the security coordinator may be configured to detect the security condition by continually monitoring the environment and detecting a change in the environment that is noncompliant with the security policy of the first one of the managed machines.

In an embodiment, the security coordinator may be configured to receive security status information from the first one of the managed machines and to detect the security condition with respect to the first one of the managed machines responsive to receiving the security status information therefrom.

In an embodiment, responsive to detection of the security condition, the security coordinator may be configured to distribute information regarding the noncompliance to the second one of the managed machines.

In an embodiment, the computing environment may be a first environment, and, responsive to detection of the security condition, the security coordinator may be configured to request relocation of the second one of the managed machines to a second environment different from the first environment in accordance with a security policy of the second one of the managed machines.

In an embodiment, responsive to detection of the security condition, the security coordinator may be configured to initiate the modification by requesting a change in an operational state of the second one of the managed machines. For example, the security coordinator may request a modification of a security policy of the second one of the managed machines, a suspension of operation of the second one of the managed machines, or a termination or shut down of the second one of the managed machines. In an embodiment, the security coordinator may be configured to determine that relocation of the second one of the managed machines is prohibited prior to initiating the modification.

In an embodiment, the security coordinator may be further configured to detect an update to a global security policy for the plurality of managed machines after initiating the modification of the second one of the managed machines.

According to a further embodiment described herein, in a method of operating a computing system including a plurality of managed machines deployed in a same computing environment, a security condition with respect to a first one of the managed machines. A modification of a second one of the managed machines in the same environment is autonomously initiated responsive to detecting the security condition with respect to the first one of the managed machines and prior to a response thereto by an environment manager with respect to the second one of the managed machines, where the environment manager is configured to manage the plurality of managed machines. The modification may be initiated by a control process that is independent of the environment manager.

According to a still further embodiment described herein, a server system includes a processor, a host operating system that executes on the processor, a virtual hypervisor that provides an interface between the host operating system and a plurality of virtual machines deployed within a virtualization environment, a virtualization environment manager that manages the virtualization environment and the plurality of virtual machines deployed therein, and a security coordinator. The security coordinator detects a security condition with respect to a first one of the virtual machines, and automatically initiates modification of a second one of the virtual machines in the virtualization environment responsive to detection of the security condition. The security coordinator autonomously and automatically initiates the modification responsive to detection of the security condition independent of and prior to a response thereto by the virtualization environment manager with respect to the second one of the virtual machines.

In an embodiment, the system may further include a policy repository that stores security policies for the plurality of managed machines, and the security condition may be or otherwise indicate a noncompliance with a security policy of the first one of the virtual machines.

In an embodiment, responsive to detection of the security condition, the security coordinator may be configured to transmit a request to relocate the second one of the virtual machines to a second virtualization environment different from the first virtualization environment in accordance with a security policy of the second one of the virtual machines, modify the security policy of the second one of the virtual machines, suspend operations of the second one of the virtual machines, or shut down of the second one of the virtual machines.

Other systems, methods, and/or devices according to some embodiments will become apparent to one with skill in the art upon review of the following drawings and detailed description. It is intended that all such additional embodiments, in addition to any and all combinations of the above embodiments, be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms used herein should be interpreted as having a meaning that is consistent with their meaning in the context of this specification and the relevant art and will not be interpreted in an idealized or overly formal sense unless expressly so defined herein.

As described herein, a computing environment may include one or more hosts, operating systems, peripherals, and/or applications. Machines in a same computing environment may have shared memory or resources, may be associated with the same or different hardware platforms, and/or may be located in the same or different physical locations. Computing environments described herein may refer to a virtualized environment and/or a physical environment. A disk image may refer to a single file or storage device containing the complete contents and structure representing a data storage medium or device, for example, by creating a complete sector-by-sector copy of the source medium.

As also described herein, a security condition may generally refer to any actual or expected inconsistency or other lack of compliance with respect to a security policy of a managed machine. For example, security condition may refer to an actual attack on a managed machine, or an increased risk of such an attack (as determined, for example, based on one or more changes in the computing environment).

Some embodiments of the disclosure described herein arise from realization that security risks are typically shared for managed machines located in the same environment (for example, virtual machines or images having the same root password). For instance, in the context of virtual machines, if one image is breached, other images in the environment might be easily breached as well. The risk of breach may be higher if one of the images has lower security controls, and/or if the hypervisor (which is a virtual machine host or manager) for an image has a lower or non-matching security level. Security attacks can be performed on the environment and nearby VMs, and/or can be performed based on even a subjective (internal policy) view of other images in the environment, such as competitor VMs that appear in the same environment. In other words, when one VM is attacked, the rest of the VMs in its environment may also be vulnerable, as they may remain at the same state and may not adapt to the attack. As a result, the attacker may be free to continue attacking nearby virtual machines, whose security levels may be unchanged until they too are attacked and react (which may be too late). Thus, the entire environment may be under risk.

Accordingly, some embodiments of the present disclosure provide for communication between managed machines, environment managers, and security controllers to allow managed machines to be adapted or modified in response to an attack or other security condition with respect to another managed machine in the same environment. For example, a security condition that is detected with respect to one managed machine may trigger a response by one or more other managed machines, for instance, by adding policies dynamically and/or by changing state or otherwise adapting configuration (e.g., moving to another environment, suspending operations, shutting down, etc.) in response to detection of the security condition, typically before the security condition can be addressed by a centralized management system.

Figure 1:
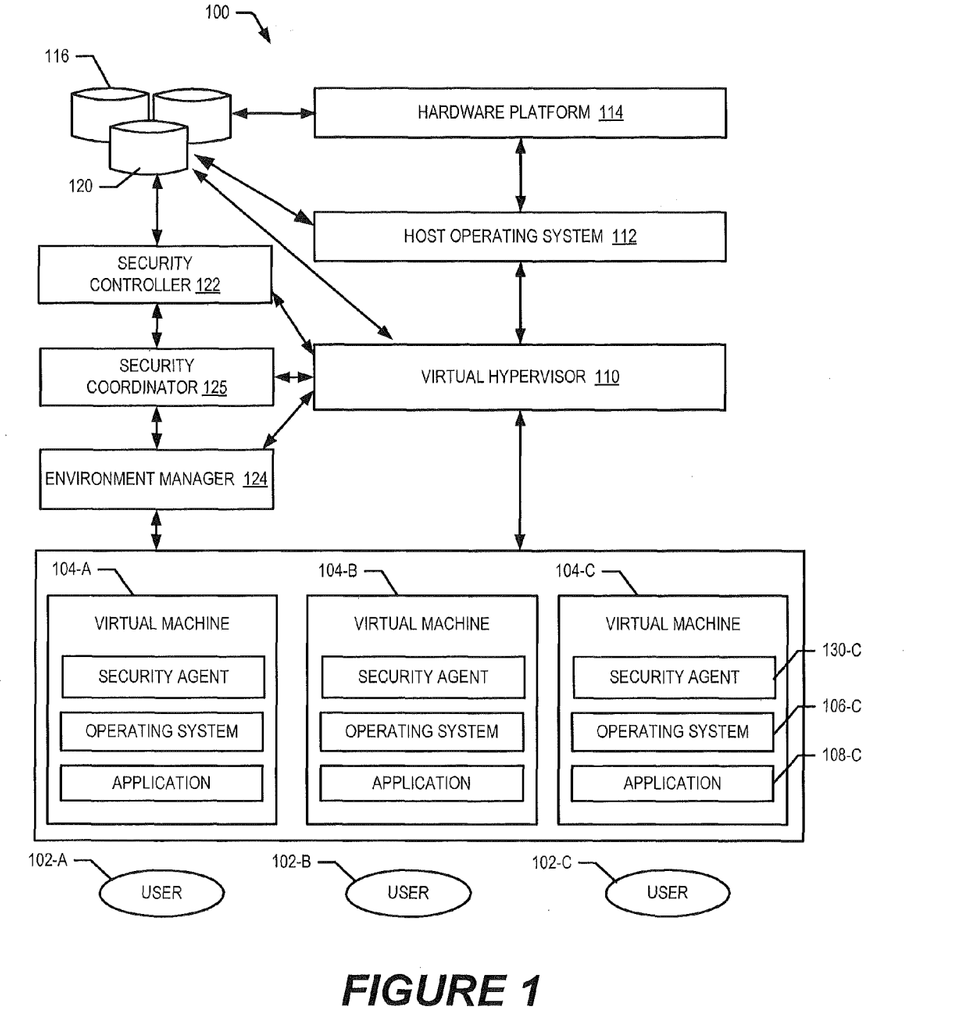
FIG. 1 is a block diagram illustrating a computing system that supports a virtual operating environment in accordance with an embodiment of the present disclosure.

FIG. 1 illustrates a computer system 100 for a virtualized computing environment in which the subject matter of the present disclosure can be embodied. Although various embodiments are described in the context of a virtualized computing environment, the present disclosure is not limited thereto and may be used to manage access to resources of non-virtual computer environments. The computer system 100 generally hosts and manages one or more managed machines (such as a managed virtual machine or virtual machine 104), each of which includes a security agent 130 and runs a guest operating system 106 and application 108. The computing needs of users 102 (e.g., humans and/or other virtual/non-virtual machines) drive the functionality of the managed machines 104. A virtual hypervisor 110 can provide an interface between the managed machines 104 and a host operating system 112 and allow multiple guest operating systems 106 and associated applications 108 to run concurrently. The host operating system 112 handles the operations of a hardware platform 114 capable of implementing managed machines 104. A data storage space 116 may be accessed by the host operating system 112 and is connected to the hardware platform 114.

The hardware platform 114 generally refers to any computer system capable of implementing managed machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of software applications, random access memory (RAM), or read only memory (ROM), removable media, or any other suitable memory component. According to the illustrated embodiments, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machines 104. One host operating system 112 is capable of implementing multiple isolated virtual machines simultaneously.

The virtual hypervisor 110 (which may also be known as a virtual machine monitor/manager or VMM) runs on the host operating system 112 and provides an interface between the managed machines 104 and the hardware platform 114 through the host operating system 112. The hypervisor 110 virtualizes the computer system resources and facilitates the operation of the managed machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the managed machines 104 present a virtualized environment to the guest operating systems 106, which in turn provide an operating environment for applications 108 and other software constructs.

The data storage space 116 of the computer system 100 includes a policy repository 120 that contains policies. The policies may be security policies that define security rules which can be used by supervisory agents, such as the virtual hypervisor 110 and/or a security agent 130 within each of the managed machines 104, to manage access to resources of the computer system 100. In detail, the security policies can be used to define security rules for managing machines, including applications, OS, hypervisors, cloud environments, servers, mobile devices, and/or IP based instrumentations, etc. The security policies usually contain rules (actions) that are associated with identified managed machines (e.g., IDs of devices and/or applications and/or types of machines), and may identify authorized groups (e.g., privileged users and/or systems). The rules can be created by many different users and/or management systems to address resource access restrictions (e.g., privileged users), architecture restrictions (e.g., application A should not be co-located with application B due to scale and load), and/or or business restrictions (e.g., a credit card transaction processing system should not be co-hosted on a same hardware platform as a customer contact list management system). The rules may further indicate acceptable levels of risk, a minimum security level with respect to other managed machines in the environment, and/or types of actions or attacks in the environment that should cause the managed machine to change its state or otherwise adapt. Each of the policies can be associated with one or more of the managed machines 104, and can include a plurality of entries that define rules for observable events, actions that are performed responsive to occurrence of the events, and/or the authorized user(s) and/or group(s) who can change policies, initiate actions, and/or participate in actions.

In accordance with various embodiments, the computer system 100 further includes a security controller 122, an environment manager 124, and a security coordinator 125. The security controller 122 is configured to assess security conditions for the system 100 and act according to the applicable security policy for each machine 104 stored in the repository 120. The environment manager 124 is configured to manage the operations of the managed machines 104. For example, the environment manager 124 may be configured to deploy, provision, activate, and/or suspend operations of virtual machines 104, and/or to move virtual machines 104 from one hypervisor to another or from one virtualization environment to the other. In performing its tasks, the environment manager 124 may typically consider server capacity and availability issues, and may consider pre-deployment security issues. However, the environment manager 124 may not necessarily monitor ongoing dynamic changes with respect to security aspects of a cloud system. Likewise, while the security controller 122 may respond to security conditions based on the stored security policy, the stored policy may be somewhat static in that it may be set during the initial deployment of the system 100 and updated at predetermined times.

Accordingly, embodiments of the present disclosure provide a security coordinator 125 that is configured to cooperate with the security controller 122 and the environment manager 124 to detect, analyze and/or respond to emerging risks in a cloud computing environment. In particular, the security coordinator 125 is configured to detect a security condition associated with one of the managed machines 104 and automatically initiate action or modification (such as a change in operational state or configuration) with respect to one or more of the other managed machines 104 in the environment in response to detecting the security condition. For example, upon detecting an attempt to access the managed machine 104-A that is inconsistent or otherwise not compliant with a security policy of the virtualization environment or the machine 104-A itself, the security coordinator 125 may request that the environment manager 124 relocate, suspend operations, shut down/terminate operations, and/or increase security with respect to one or more of the other managed machines 104-B and/or 104-C in the same environment. In an embodiment, the security coordinator 125 may detect the security condition in response to receipt of security status information or other notice from the machine 104-A indicating the inconsistency with the security policy, and may distribute information regarding the inconsistency to the other managed machines 104-B and/or 104-C. As such, the security coordinator 125 may adaptively and proactively initiate or implement changes in response to a security risk at one of the machines 104-A prior to detecting an attack or other security condition with the other managed machines 104-B and/or 104-C. Moreover, the security coordinator 125 may operate autonomously to initiate a response to the detected security condition, by a control process that operates independent of (and in many instances prior to) a response by the environment manager 124 or other centralized management system.

Although illustrated by way of example as separate blocks in FIG. 1, it will be understood that the security coordinator 125 may be integrated or otherwise included in the security controller 122 (or even in the environment manager 124) to provide an interface therebetween in an embodiment. More generally, while illustrated herein with reference to specific functions performed by specific blocks, it will be understood that the functionality of blocks shown herein may be combined, divided, or eliminated. Also, while illustrated in FIG. 1 with respect to managed virtual machines 104 in a virtual computing environment, it will be understood that embodiments of the present disclosure may be applied to managed machines in physical computing environments and/or cloud computing environments as well.

Figure 2:
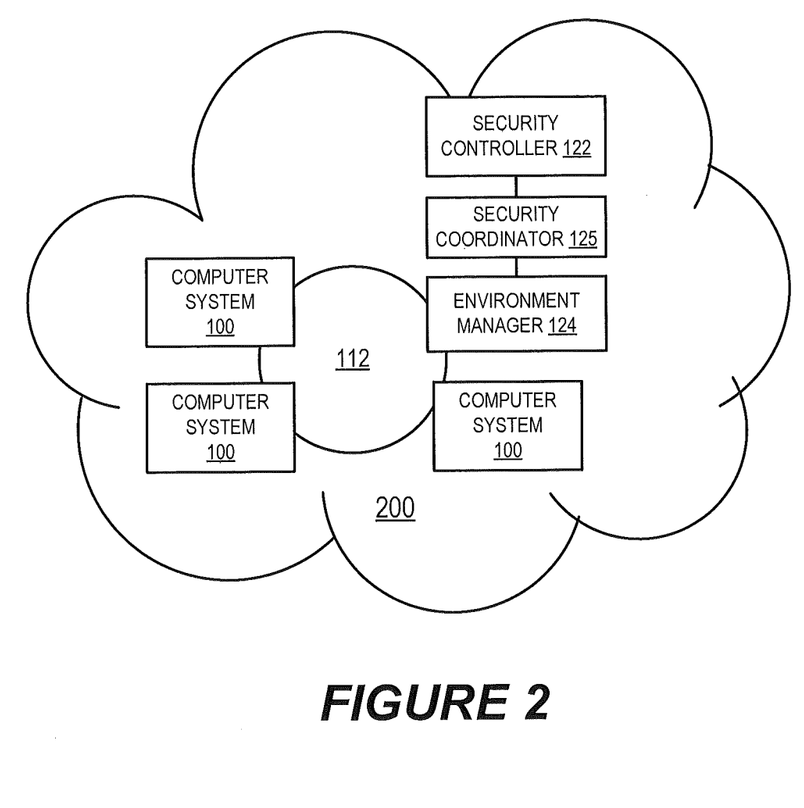
FIG. 2 is a block diagram illustrating a physical layout of a computing environment in accordance with an embodiment of the present disclosure.

FIG. 2 illustrates an example of a physical layout of a computing environment in accordance with an embodiment of the present disclosure. Referring now to FIG. 2, a computing environment 200 (referred to generally as cloud 200) may include one or more server systems 100 that may include one or more electronic computing devices configured to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The security controller 122, environment manager 124, and security coordinator 125 may also be communicatively coupled to the server systems 100 via the network 112, and thus, may monitor, manage, and proactively respond to dynamic changes in security conditions with respect to one or more of the server systems 100. As such, the security controller 122, environment manager 124, and security coordinator 125 may collectively define a central management system for the server systems 100. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Figure 3:
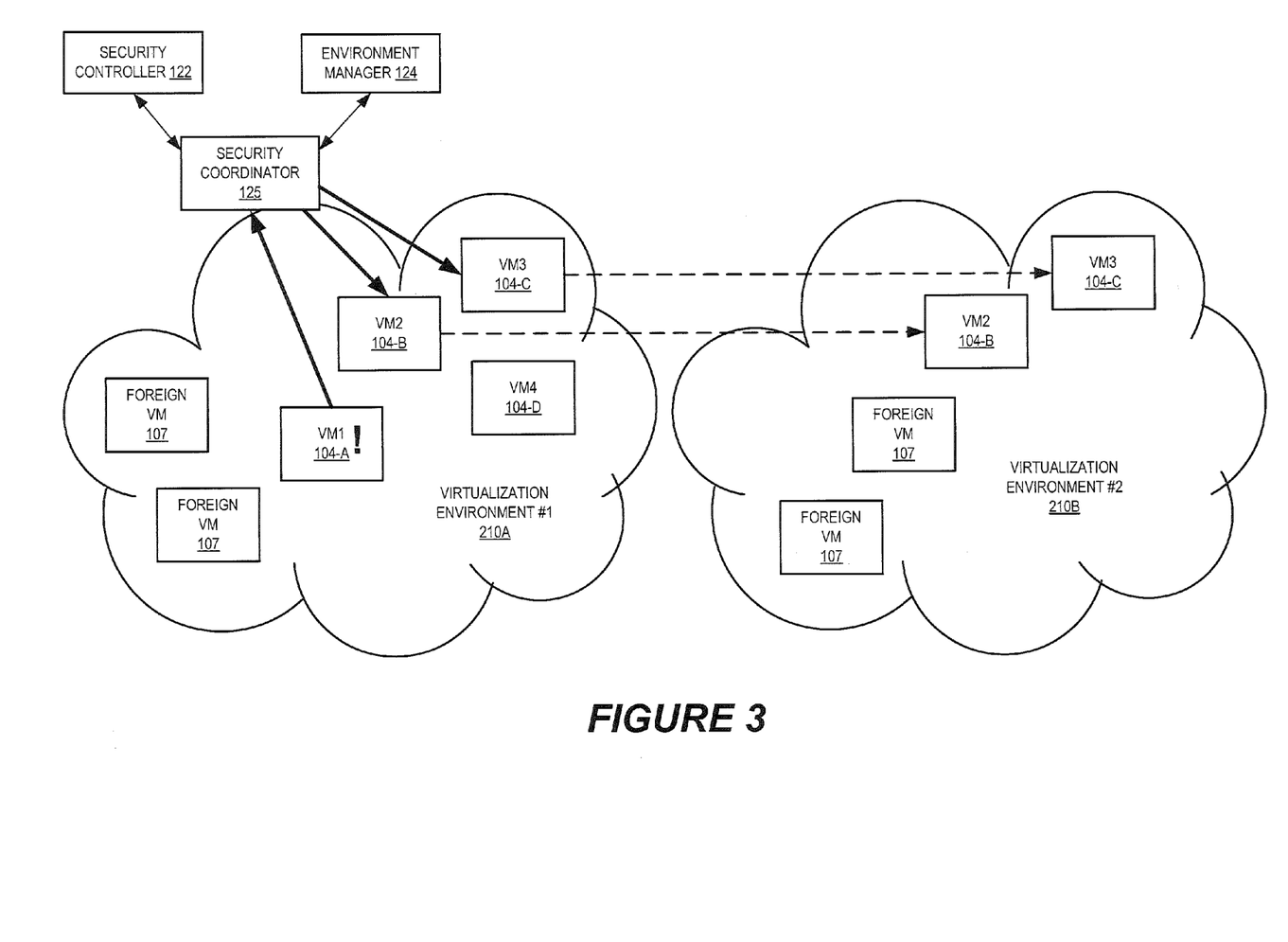
FIG. 3 is a block diagram illustrating logical groupings of virtual machines within different virtualization environments in accordance with an embodiment of the present disclosure.

While FIG. 2 illustrates a physical configuration of servers within a cloud 200, FIG. 3 illustrates a logical grouping of virtual machines 104 deployed within different virtualization environments 210A and 210B that may exist within the cloud 200 in accordance with embodiments of the present disclosure. Virtual machines that are deployed within a same virtualization environment may share physical resources within a server 100. For example, virtual machines that are deployed within a single virtualization environment may share physical memory, storage, communication facilities and other resources or services of a server 100. The virtual machines 104 may also have same or similar resource access privileges (e.g., processor utilization, priority, memory allocation, communication interface access privileges, etc.). Virtual machines 104 within the same virtualization environment can be managed by a single virtualization environment manager, such as the environment manager 124. Other virtual machines (illustrated in FIG. 3 as foreign VMs 107) in the environments 210A and 210B, however, may be managed by a different environment manager.

In the domain of virtualization and cloud computing, dynamic migration and movement of the virtual machines 104 (also referred to herein as "images") can be an integral part of dynamic capacity management, for example, as performed by the environment manager 124. In particular, virtual machines 104 can be deployed in particular virtualization environments and dynamically relocated and organized by the environment manager 124 to increase the efficiency of operating and/or managing a virtual computing environment. For example, the environment manager 124 may group virtual machines 104 into clusters, also referred to herein as "grids," in order to provide load balancing across multiple servers. However, while capacity management may be performed dynamically, security changes and adjustments are usually performed in initial deployment, and are conventionally not modified to match ongoing changes in security conditions.

In particular, in some conventional methods of securing virtual images in virtualization and cloud environments, virtual images (VM) security and enforcement levels have been driven based on central policy management, in terms of both security policy design and distribution. In many cases, the security policy is set during the first deployment of the system, and is kept updated according to generic security policy updates from the central location or central components. As such, when a change in security conditions occurs in an environment where a conventional VM resides (such as breach in a security policy of another VM or another type of VM in the same environment), the conventional VM is not changed or prepared to protect against potential attack. Rather, the VM will react, if possible, when the VM is directly attacked. Reactions may also be subject to the frequency of the reaction of the central management system; thus, an updated policy may be provided to the VMs only after global changes in the policy have been implemented. This conventional centralized approach may therefore lead to certain security risks and vulnerabilities, for example, such that an attacker can exploit and create rapid damage to the environment as a whole (e.g., with respect to similar or nearby VMs beyond the first comprised VM) by detecting and systematically exploiting a backdoor. In other words, some conventional systems are driven in a centralized master-slave policy update approach, and focus on changing global security policies, rather than stopping and protecting the image while it is under attack or is likely to be attacked. Such conventional VM enforcement rules are thus considered reactive to the central management system, and may not be flexible enough in dynamic virtual environments.

In contrast, some embodiments described herein allow for self-adaptive or proactive security policy improvement (also referred to herein as automatous security computing). In particular, as described below with reference to the block diagram of FIG. 3 and the flowchart of FIG. 5, an embodiment described herein may allow virtual machines deployed in the same environment to proactively self-adapt to changes in security with respect to other virtual machines in the same environment, prior to action by the centralized management system.

For example, as shown in FIG. 3, a virtual machine VM1 104-A includes a security agent which detects an attempt to modify one of its sensitive configuration files. As such, VM1 104-A determines that is being attacked. VM1 104-A (via its security agent) then transmits a notification to a central environment manager (such as the environment manager 124) via the security coordinator 125. The central environment manager is responsible for managing the virtualization environment 210A, and the security coordinator 125 is configured to monitor, analyze and/or respond to emerging risks in the virtualization environment 210A. In an embodiment, the central environment manager and/or the security coordinator 125 may also be responsible for managing and/or monitoring the virtualization environment 210B.

Figure 5:
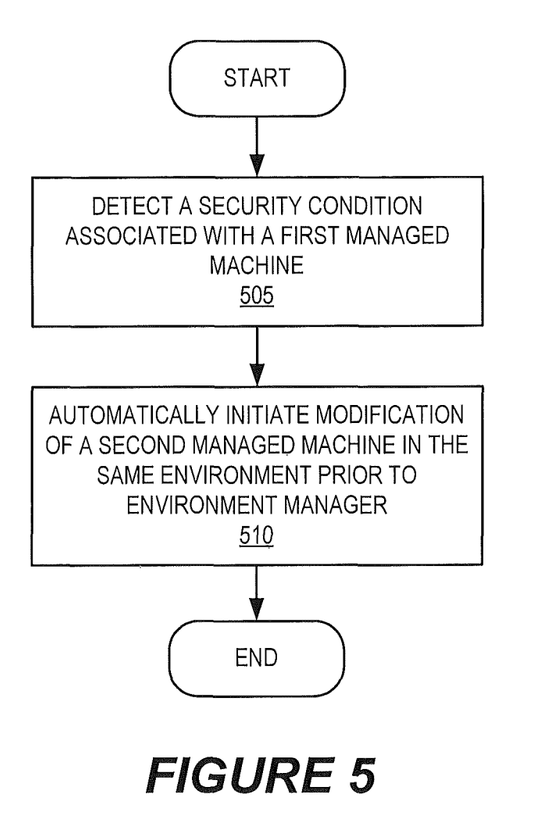
FIGS. 5 and 6 are flowcharts illustrating operations of self-adaptive managed machines and related components in accordance with an embodiment of the present disclosure.

A security condition with respect to VM1 104-A is thereby detected by the security coordinator 125 (block 505 of FIG. 5). In the present example, the security coordinator 125 detects the security condition in response to receiving the notification from VM1 104-A. For instance, the notification may indicate that the attempt to modify the sensitive configuration file is inconsistent or otherwise non-compliant with the security policy of VM1 104-A. In other embodiments, the security coordinator 125 itself may determine the existence of the security condition by continually monitoring the environment 210A and performing a comparison with the applicable security policy to determine the inconsistency or other non-compliance. For example, the security coordinator 125 may determine that the security policies of the virtual machines 104 are not compatible with the security policies of other virtual machines 107 in the virtualization environment 210.

A change in operational state, configuration, or other modification of the other virtual machines VM2 104-B and VM3 104-C in the same environment 210A is thus automatically initiated and/or implemented in response to detecting the security condition with respect to VM1 104-A (block 510 of FIG. 5). In the present example, the security coordinator 125 distributes a security risk message including information about the security condition (for example, the location and nature of the attack on VM1 104-A) to VM2 104-B, VM3 104-C, and VM4 104-D in response to receiving the notification of the attack from VM1 104-A. VM2 104-B and/or VM3 104-C can thereby proactively adapt to the security condition in response to the message from the security coordinator 125 by improving or increasing security policies, performing an action (such as suspending operations or shutting down), and/or requesting to be moved to another environment before an attack on VM2 104-B and/or VM3 104-C occurs. The actions can be initiated by the security coordinator, 125, VM2 104-B, and/or VM3 104-C autonomously by transmitting a request to the environment manager 124, and/or based on directions received from the environment manager 124 for changing the life status and location of the images (move, shutdown, suspend, etc.), for example, depending on the particular VM and the availability of the application program interface (API) in the virtualized environment 210A. As such, the changes in VM2 104-B and VM3 104-C are triggered by the attack on VM1 104-A, but are implemented prior to detection of an attack or other security condition in VM2 104-B and/or VM3 104-C and prior to action by the environment manager 124. However, depending on the applicable security policy, not all VMs in the environment 210A may respond to the security condition. For example, VM4 104-D may have relatively low security requirements, and thus, may take no action in response to the message from the security coordinator 125.

Still referring to FIG. 3, in the present example, VM2 104-B and VM3 104-C are moved to a different virtualization environment 210B (by a process referred to herein as relocation or migration) in response to detection of the security condition with respect to VM1 104-A. A VM can be moved to the different environment 210B, for example, by implementing the steps of: suspending operations of the VM (e.g., the source VM to be moved) in environment 210A; cloning the source VM to provide a clone VM in environment 210B; provisioning the clone VM in environment 210B; and unprovisioning the source VM in environment 210A. The VMs can also be moved from one environment 210A to another 210B (or otherwise from one host to another host) according to optimization and balancing needs. Additionally or alternatively, the VMs may be moved from virtualization environment 210A to virtualization environment 210B when it is detected that their security policies are not compatible with the security policies of other virtual machines 107 in the virtualization environment 210A.

The operations for moving the VMs can be performed by the environment manager 124, which may automatically determine whether and where to move the VMs based on the detected security condition, the security requirements of the VMs, and/or the parameters of the new environment. However, in some embodiments, a VM itself may be configured to verify that the new environment is compatible with its security requirements, and if not, to refuse installation or roaming. For instance, VM4 104-D may determine that environment 210B does not comply with its security policy, and thus, may refuse a request for relocation from the environment manager 124. Accordingly, in the present example, when a nearby VM1 104-A reports to the security coordinator 125 (or to the host 112) that it is under attack, or if the attack is otherwise detected by the security coordinator 125 or by security personnel, at least some of the recipients of the security risk message distributed by the security coordinator 125 (that is, the environment manager 124 (such as AppLogic or vCloud) and/or the OS of VM2 104-B and VM3 104-C) can act according to a predefined response based on the level and type of the security risk and the applicable security policies, leading to self-adaptive action of each VM2 104-B, VM3 104-C separately.

Consequently, the non-attacked machines VM2 104-B and VM3 104-C may proactively prepare for the threat prior to being attacked themselves, and prior to action by the central management system. Such preparation can include updating VM policies according to requests from the central management system, and/or proactively protecting the VM itself by modifying policies or other security parameters, blocking access, suspending activation, moving to another secured location, or even stopping activity as a whole. A high probability of an attack on these other machines VM2 104-B and VM3 104-C can thereby be reduced in response to the attack on VM1 104-A until overall security can be increased (for example, by patching the breach or by updating an anti-virus, etc.) by central management. Dynamically adaptive VMs can thus be achieved in a lean and rapid manner, and the implemented security changes can later be refined and organized according to a subsequently-adopted global or overall security risk remedy and/or based on the governance control configuration of the specific IT environment.

Accordingly, embodiments described herein monitor the computing environment and proactively self-adapt to changes in security risks. Although some embodiments have been described primarily with reference to virtualized dynamic environments, it will be understood that embodiments of the present disclosure can be applied to physical static environments as well, with the exception of relocating or roaming an image as a remedy reaction to an attack. As such, the term "managed machine" may be used herein to refer to virtual machines and/or physical machines.

Figure 4:
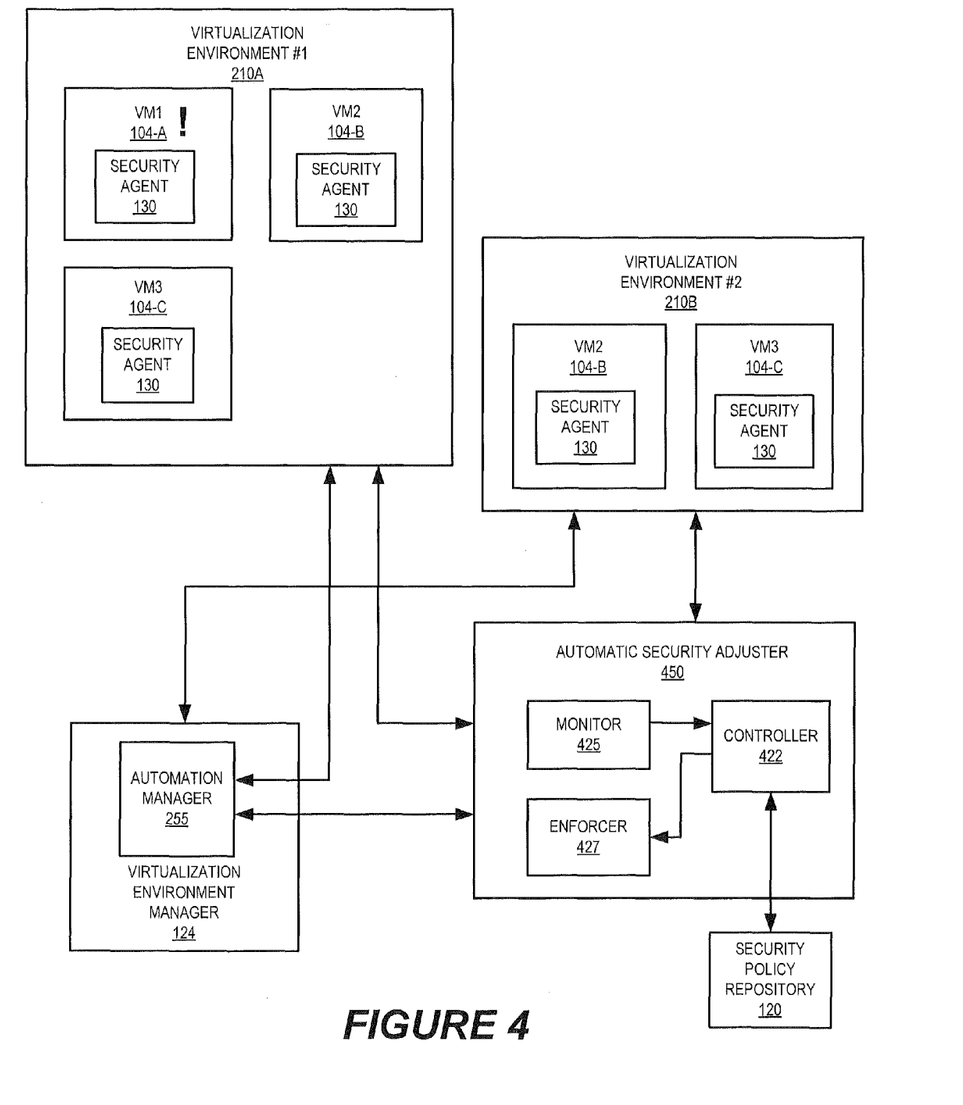
FIG. 4 is a block diagram illustrating logical groupings of virtual machines within different virtualization environments in accordance with an embodiment of the present disclosure in greater detail.

FIG. 4 is a block diagram illustrating logical groupings of virtual machines 104 within different virtualization environments 210A and 210B in greater detail. Referring to FIG. 4, an exemplary system includes two virtualization environments 210A, 210B in which a plurality of virtual machines 104 are deployed. In the example illustrated in FIG. 4, virtual machines VM1 104-A, VM2 104-B and VM3 104-C are initially deployed in a first virtualization environment 210A. Each of the virtual machines 104 includes a respective security agent 130 that stores, monitors and controls a security policy of the virtual machine. The security agent 130 is configured to record the security status of its corresponding VM 104, to send notifications regarding the current security status of the VM 104 to the monitor 425 of the automatic security adjuster 450 (described below), and to enforce a local security policy at its corresponding VM 104 based on information from the enforcer 427 of the automatic security adjuster 450.

A virtualization environment manager 124 is communicatively coupled to and manages the virtualization environments 210A, 210B. In an embodiment, the virtualization environment manager 124 may be provided external to the virtualization environments 210A and 210B for which it is responsible. The environment manager 124 may include an automation manager 255 that uses server automation/provisioning tools (also referred to herein as server deployment tools) to manage the virtual machines 104 in a cloud computing environment. These tools may be used, for example, to deploy, provision, activate, suspend, relocate, and otherwise manage the operation of virtual machines. As such, the automation manager 255 is configured to implement changes with respect to the virtual machines 104 (and/or configurations thereof) and determines the assignment and relocation of virtual machines 104 to particular virtualization environments 210A or 210B (and/or grids/clusters within the environments). More particularly, the automation manager 255 receives requests for actions relating to the VMs 104, such as moving a VM 104 (to a different grid, environment, hypervisor, and/or physical location), suspending operations of a VM 104, shutting down a VM 104, etc., in response to detection of a security condition, and may determine whether and how to implement the requested actions. The requests may be received from the automatic security adjuster 450 described below or even the VMs 104 themselves in some embodiments.

Still referring to FIG. 4, an automatic security adjuster 450 is communicatively coupled to both the environment manager 124 and the virtualization environments 210A and 210B. The automatic security adjuster may include the functionality of both the security controller 122 and the security coordinator 125 described herein. Accordingly, the automatic security adjuster 450 is configured to assess security risks to the VMs 104 and take action according to the applicable security policy. In particular, the automatic security adjuster 450 includes a monitor component 425 that is operable to continually monitor the VM environments 210A and/or 210B and gather information relating to the current security status of the virtual machines 104. For example, the monitor component 425 may detect new VMs in the environments 210, collect security status from the VMs 104 in the environments 210A and 210B, and detect security changes in the environments 210A and 210B. Any detected changes to the environment may be transmitted to the controller component 422.

The controller component 422 analyzes the information from the monitor component 425 and formulates a plan for proactively adapting the virtual machines 104 in response to any security risks detected by the monitor component 425. In particular, the controller component 422 may monitor the security policies of the virtual machines 104 within a virtual computing environment 210A and develop recommendations that can be provided to a virtualization environment manager 124 for implementing changes to the virtual machines 104 in response to a detected security condition. For example, in the event that a security condition in the environment 210A is detected by the monitor component 425, the controller component 422 may check the applicable security policy stored in the repository 120 for each of the VMs 104, and if the environment risk for a particular VM 104 is higher than what was defined in its policy as acceptable (or is otherwise non-compliant with the policy), the controller component 422 determines the appropriate course of action (consistent with the security policy) transmits a request to the enforcer component 427 to take such action. The controller component 422 may also make a recommendation as to where to locate virtual machines 104 when they are removed from a virtualization environment 210A because of security policy incompatibility. As such, the operations performed by the controller component 422 may effectively provide an automatic reacting security policy that can take autonomous action in response to a detected security risk, independent of a global security policy.

The enforcer component 427 communicates with the environment manager 124 and/or the security agents 130 of the VMs 104 based on the request from the controller component 422 to change the current state/configuration of the VMs to a new state/configuration based on the plan generated by the controller component 422. For example, when the controller component 422 determines that a security status change for one or more of the VMs 104 in the environment 210A is desired, the enforcer may suggest a more hardened or stringent security policy for the VM(s) 104 to the corresponding security agent 130, and/or may suggest that the environment manager 124 implement an action such as relocation of the VM(s) 104 to a safer environment 210B.

Figure 6:
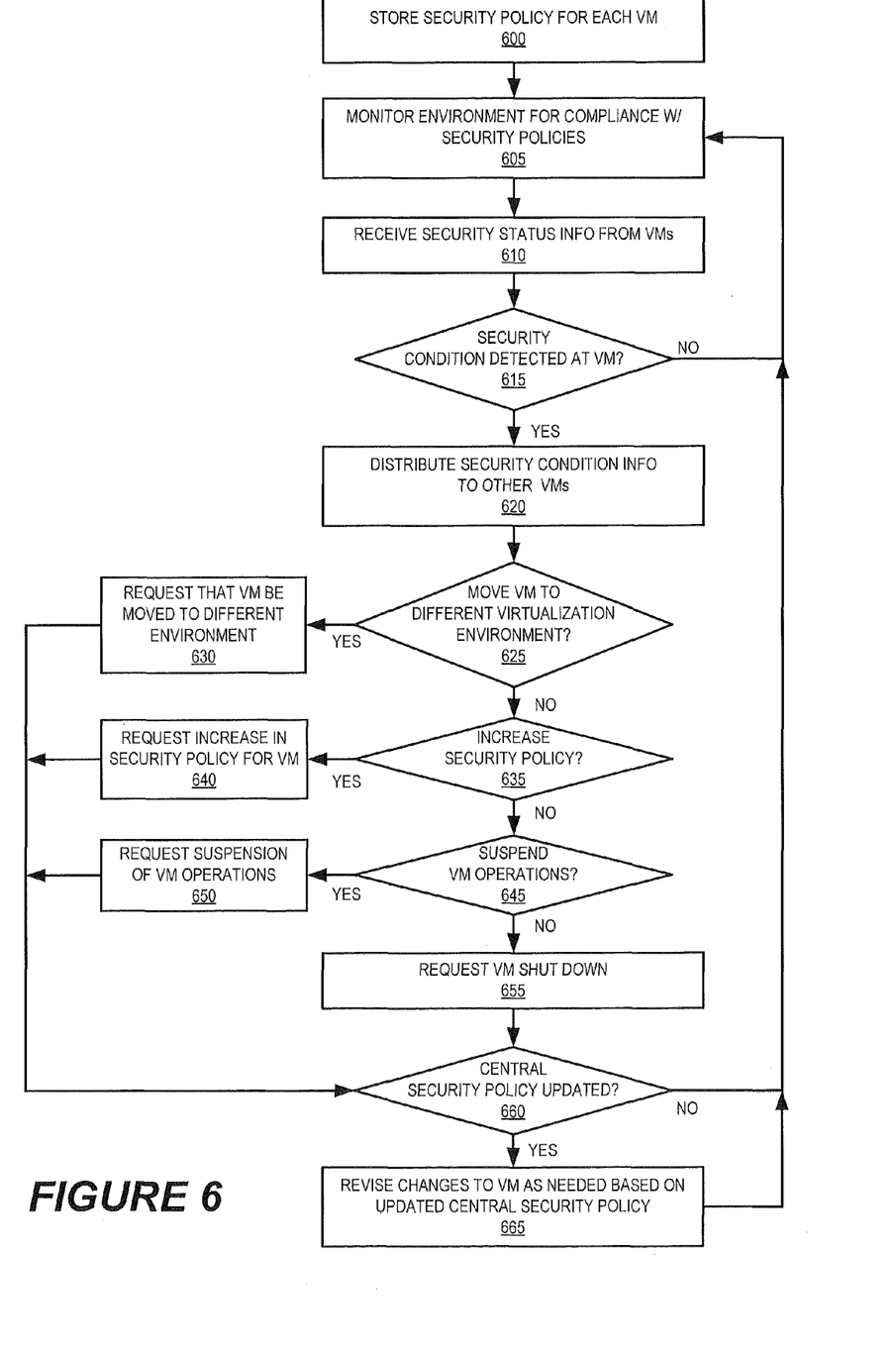

Operation of the automatic security adjuster 450 and the components thereof will be described in more detail below with reference to the flowchart of FIG. 6. Referring now to FIGS. 4 and 6, an applicable security policy (such as minimum security level of VMs around it, maximum number of attacks in a period allowed in the environment, black list of VM owner it does not allow to coexist with) is stored in the repository for each of the virtual machines VM1 104-A, VM2 104-B, and VM3 104-C in environment 210A (block 600). The monitor component 425 monitors the virtualization environment 210A, and provides information to the controller component 422, which verifies that the current conditions in the environment 210A match the security requirements of the self-adaptive virtual machines VM1 104-A, VM2 104-B, and VM3 104-C based on compliance with the applicable security policies (block 605). The monitor component 425 also receives security status information from the virtual machines VM1 104-A, VM2 104-B, and VM3 104-C block 610). For example, the security status information may itself indicate a condition that is noncompliant with the stored security policy of a particular VM 104-A. As another example, the controller component 422 may compare the received security status information with the stored security policy, and may detect a security condition if the comparison indicates the noncompliance.

If the controller component 422 detects a security condition with respect to the environment 210A and/or one of the virtual machines VM1 104-A, VM2 104-B, and VM3 104-C (block 615) the controller component 422 proactively takes action to address the security condition. In particular, the controller component 422 transmits or otherwise distributes information regarding the security condition to one or more of the virtual machines VM1 104-A, VM2 104-B, and VM3 104-C in the environment 210A (block 620). For example, where the security status information received from VM1 104-A (at block 610) indicates that VM1 104-A is being accessed in a manner that does not comply with its security policy, the controller component 422 detects that a security risk is present (at block 615) and distributes information about the unauthorized access to the other virtual machines VM2 104-B and VM3 104-C in the environment 210A (at block 620) before these machines are attacked. The controller component 422 may also notify a centralized management system (such as the environment manager 124) that a security risk is present in the environment 210A, and may take action in response to a remote request from the centralized system.

The controller component 422 may respond to the detected security condition with a variety of actions. For example, in response to detection of a security condition with respect to VM1 104-A in the environment 210A, the controller component 422 may determine that relocating the virtual machines VM2 104-B and VM3 104-C to the environment 210B would address the security condition in a manner that is transparent to the users 102 (that is, without interrupting the services provided by the virtual machines VM2 104-B and VM3 104-C). As such, it is determined whether movement of the virtual machines VM2 104-B and VM3 104-C is permitted (block 625). For example, the controller component 422 may consult the policy repository 120 to determine whether the respective security policies of the virtual machines VM2 104-B and VM3 104-C would permit relocation to the environment 210B. The controller component 422 and/or the environment manager 124 may also determine whether such relocation would be permissible under applicable laws (as well as under the applicable security policies), based for instance on the level of security associated with the virtual machines VM2 104-B and VM3 104-C and/or the physical location of the hardware platform 114 hosting the virtualized environment 210A in which the virtual machines VM2 104-B and VM3 104-C are currently active. The virtual machines VM2 104-B and VM3 104-C may also request movement or relocation themselves (i.e., "move me please"), for example, in response to the security risk information (at block 620). If it is determined that relocation is permissible (at block 625), the controller component 422 requests that the virtual machines VM2 104-B and VM3 104-C be moved to the environment 210B (at block 630).

If however it is determined that relocation is not permissible (at block 625), one or more alternative actions are taken to initiate a change in configuration or modification of the virtual machines VM2 104-B and VM3 104-C. For example, if the request to move the virtual machines VM2 104-B and VM3 104-C is refused by the environment manager 124 or otherwise fails, the virtual machines VM2 104-B and/or VM3 104-C may attempt further adaptive changes or modifications (by internal or external action) to adjust activity level as best suited for the environment 210A. In particular, it is determined whether increasing or hardening the applicable security policies would be sufficient to address the security condition (block 635), and if so, such an increase in security is requested (block 640). For example, the enforcer component 427 may transmit a request to the security agents 130 of the virtual machines VM2 104-B and VM3 104-C to increase the level of security provided by the applicable security policies, and the security agents 130 of the virtual machines VM2 104-B and VM3 104-C may implement such an action by transmitting a request to the controller component 422 to forward the hardened policies from pre-planned bank of security policies stored in the repository 120.

If it is determined that increasing security would not be sufficient to address the security condition (at block 635), it is determined whether suspension of VM operations would be sufficient to address the security condition (block 645), and if so, such a suspension of operations is requested (block 650). For example, the enforcer component 427 may transmit a request to the environment manager 124 to suspend the operations of the virtual machines VM2 104-B and VM3 104-C, and the automation manager 255 may implement the requested suspension. The virtual machines VM2 104-B and VM3 104-C may self-suspend operations in some embodiments, for instance, in response to denial of the aforementioned relocation requests and/or a hardened policy requests.

However, if it is determined that suspending operations would not be sufficient (at block 645), a shutdown of the virtual machines VM2 104-B and VM3 104-C is requested (block 655). The shut down may be implemented by the environment manager 124 responsive to a request from the enforcer 427 or requests from the virtual machines VM2 104-B and VM3 104-C themselves (self-shut down). Other actions that may be implemented in response to detection of a security condition in the environment 210A may include saving configuration states and/or other data for the virtual machines VM2 104-B and VM3 104-C (e.g., taking a "snapshot" of the non-attacked virtual machines VM2 104-B and VM3 104-C) to revert to needed, and/or transmitting notification to the central automation manager 255 and awaiting further instructions. As such, the automatic security adjuster 450 and/or the virtual machines VM2 104-B and VM3 104-C themselves may operate autonomously in response to detection of a security condition, both independent of and prior to action by the environment manager 124 or other centralized management system.

Accordingly, the non-attacked virtual machines VM2 104-B and VM3 104-C may be automatically adapted to a detected security condition, for example, by notifying the automation system 255 and requesting relocation to a safer environment. If the request is refused or otherwise fails, the automatic security adjuster 450 and/or the virtual machines VM2 104-B and VM3 104-C themselves may take an alternative action to adjust to a configuration best-suited to address the detected security risk, before the security condition is addressed by the environment manager 124 or other centralized management system. After such independent action has been taken in response to the detection of the security condition (at block 615), it is determined whether a central or global security policy has been updated (block 660), and if so, the changes made to the virtual machines VM2 104-B and VM3 104-C are revised as necessary based on the updated global security policy (block 665).

Embodiments described herein thus provide significant advantages. For example, the security of the VM environment is continuously checked after initial deployment/setup, taking into account that VMs may move, that other VMs can be added to the environment, and/or that the environment itself can change. As such, security risks to VMs are monitored continually and not just at the time of deployment, and if a risk level is not acceptable, automatic adaptive action (such as migrating a VM to a different environment or hardening its security policy) is initiated or implemented.

As described herein, a security policy for each managed machine is created, stored, and compared with dynamically changing environmental conditions. The security policy may contain or indicate a set of acceptable levels of risk, a minimum security level with respect to other managed machines in the same environment, identification of other managed machines with which coexistence is prohibited, and/or types of actions or attacks in the environment that should cause the managed machine to change its state or otherwise adapt. The security policy may also indicate a preferential order in which such adaptive actions should be attempted (for example, first relocation, then suspension, then shut down as a last resort). Accordingly the security coordinator and/or the security adjuster described herein continually monitors the environment for non-compliance with the stored security policies, and if such non-compliance is detected due to a change in the environment, instructs one or more other managed machines in the same environment to take a predefined action consistent with its corresponding security policy. For instance, a managed machine under direct attack can react rapidly based on its security policy, and other managed machines in the environment can proactively adjust before a direct attack thereon (with the support of a centralized automation management system). As such, a security condition detected in one managed machine can trigger a change in another managed machine located in the same computing environment.

More particularly, in virtual computing systems described herein, the entire system (VM under attack, other VMs in same environment, centralized security coordinator/monitoring system, centralized automation control/environment management system) may continually and/or constantly monitor the virtualization environment for security risks. When an image/VM indicates a security condition (such an unacceptable level of risk) it can take appropriate actions (self-adaptive actions such as the ones in the examples above) and notify the security coordinator for the virtualization environment. Other active VMs in the environment are notified of the potential direct attack by the security coordinator, and cascading actions are taken to migrate the other active VMs to a different environments and/or locations, to change the security levels of the other active VMs, and/or to otherwise protect the other active VMs prior to a direct attack thereon. Accordingly automated actions are taken to move the VMs into a secure environment, or to suspend/shutdown and alert the centralized management system for manual recovery or global policy update. In contrast to conventional centralized management, rapid and autonomous self-adaptation according to embodiments of the disclosure reduces the exposed security risk timeframe of the VMs (in some instances to the minimum possible) until centralized changes can be made to address the detected problem.

Some embodiments may thus provide self-adaptive modification of virtual machines that can respond to dynamic changes in security levels within their environment by a control process that is independent of operation of centralized management. That is, it may not be sufficient for the centralized management to check during virtual machine setup that the virtual machines in the same environment have a sufficient security level for the environment, since policy and virtual machine usage may change. Thus, systems/methods described herein may continually and/or constantly monitor the environment, and may automatically detect and adjust to changes in security conditions of other virtual machines within the environment, thereby enabling an active/deployed production environment to be self-adjusting. These systems/methods may also operate independent of a centralized management system, in that operations to dynamically change operational state or otherwise adapt to security risks may be initiated (but not necessarily implemented) without involvement of the environment manager (although the environment manager may ultimately be involved in implementation of the changes).

Systems/methods in accordance with the present disclosure may thus make active changes due to security modifications, such that a security change in one virtual machine can trigger a change in another virtual machine, and/or a suggestion to move it to a more appropriate virtualization environment.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the present disclosure being set forth in the following claims.

The invention claimed is:

1. A computer system comprising:
an environment manager to manage operations of a plurality of managed machines within a computing environment; and
a security coordinator, distinct from the environment manager, to communicate with the plurality of managed machines, detect a security condition with respect to a first one of the managed machines, and initiate modification of a second one of the managed machines in the computing environment prior to a response to the security condition by the environment manager and responsive to detection of the security condition with respect to the first one of the managed machines,
wherein said modification comprises an increase in a level of a security policy to be enforced for the second one of the managed machines,
wherein, to initiate the modification of the second one of the managed machines, the security coordinator is to determine, independent of the environment manager, to increase the level of the security policy of the second one of the managed machines, responsive to detection of the security condition with respect to the first one of the managed machines,
wherein the environment manager and the security coordinator comprise operations that are performed by a processor,
wherein the modification of the second one of the managed machines is initiated by the security coordinator independent of the environment manager, prior to occurrence of a second security condition with respect to the second one of the managed machines, and prior to detection of an attack on the second one of the managed machines, and
wherein the increase in the level of the security policy to be enforced for the second one of the managed machines comprises blocking access to resources of the second one of the managed machines.

2. The system of claim 1, wherein the security condition comprises a noncompliance with a security policy of the first one of the managed machines.

3. The system of claim 2, wherein the security coordinator detects the security condition by continually monitoring the computing environment and detecting a change in the computing environment that is noncompliant with the security policy of the first one of the managed machines.

4. The system of claim 2, wherein the security coordinator receives security status information from the first one of the managed machines and detects the security condition with respect to the first one of the managed machines responsive to receiving the security status information therefrom.

5. The system of claim 2, wherein, responsive to detection of the security condition, the security coordinator is to distribute information regarding the noncompliance to the second one of the managed machines.

6. The system of claim 1, wherein the computing environment comprises a first computing environment, and wherein, responsive to detection of the security condition, the security coordinator is to request the relocation of the second one of the managed machines to a second computing environment different from the first environment in accordance with a security policy of the second one of the managed machines.

7. The system of claim 1, wherein, responsive to detection of the security condition, the security coordinator is to further perform one selected from the group consisting of request a suspension of operation of the second one of the managed machines, or request shut down of the second one of the managed machines.

8. The system of claim 7, wherein the security coordinator determines that relocation of the second one of the managed machines is prohibited by a security policy prior to initiating the modification.

9. The system of claim 1, wherein the security coordinator is to further detect an update to a global security policy for the plurality of managed machines after initiating the modification of the second one of the managed machines.

10. A method of operating a computing system comprising a plurality of managed machines within a computing environment, the method comprising:
  detecting a security condition with respect to a first one of the managed machines; and
  initiating modification of a second one of the managed machines in the computing environment responsive to detecting the security condition with respect to the first one of the managed machines and prior to a response to the security condition by an environment manager, wherein the environment manager manages operations of the plurality of managed machines,
  wherein said modification comprises an increase in a level of a security policy to be enforced for the second one of the managed machines,
  wherein initiating the modification of the second one of the managed machines comprises determining, independent of the environment manager, to increase the level of the security policy of the second one of the managed machines, responsive to detecting the security condition with respect to the first one of the managed machines,
  wherein the modification of the second one of the managed machines is initiated independent of the environment manager, prior to occurrence of a second security condition with respect to the second one of the managed machines, and prior to detection of an attack on the second one of the managed machines, and
  wherein the increase in the level of the security policy to be enforced for the second one of the managed machines comprises blocking access to resources of the second one of the managed machines.

11. The method of claim 10, wherein the security condition comprises a noncompliance with a security policy of the first one of the managed machines.

12. The method of claim 11, wherein detecting the security condition comprises:
  continually monitoring the computing environment after deployment of the managed machines therein; and
  detecting a change in the computing environment that is noncompliant with the security policy of the first one of the managed machines.

13. The method of claim 11, wherein detecting the security condition comprises:
  receiving security status information from the first one of the managed machines; and
  detecting the security condition with respect to the first one of the managed machines responsive to receiving the security status information therefrom.

14. The method of claim 11, wherein initiating modification comprises:
  distributing information regarding the noncompliance with the security policy of the first one of the managed machines to the second one of the managed machines.

15. The method of claim 10, wherein the computing environment comprises a first computing environment, and wherein initiating modification comprises:
  requesting the relocation of the second one of the managed machines to a second computing environment different from the first computing environment in accordance with a security policy of the second one of the managed machines.

16. The method of claim 10, wherein the modification of the second one of the managed machines further comprises one selected from the group consisting of:
  requesting a suspension of operation of the second one of the managed machines; and
  requesting a shutdown of the second one of the managed machines.

17. The method of claim 16, further comprising:
  determining that relocation of the second one of the managed machines is prohibited by a security policy prior to initiating the modification.

18. The method of claim 1, further comprising:
  detecting an update to a global security policy for the plurality of managed machines after initiating modification of the second one of the managed machines.

19. A server system, comprising:
  a processor;
  a host operating system that is executed on the processor;
  a virtual hypervisor to provide an interface between the host operating system and a plurality of virtual machines within a virtualization environment;
  a virtualization environment manager to manage the virtualization environment and operations of the plurality of virtual machines deployed therein; and
  a security coordinator, distinct from the virtual hypervisor, to:
    receive a first security policy to be enforced for a first one of the virtual machines from a policy repository which stores security policies for the plurality of managed machines;
    receive a second security policy to be enforced for a second one of the virtual machines from the policy repository;
    monitor the first one of the virtual machines for a security condition with respect to the first one of the virtual machines, wherein the security condition comprises a non-compliance of the first security policy for the first one of the virtual machines;
    detect a first security condition with respect to the first one of the virtual machines which comprises the non-compliance of the first security policy for the first one of the virtual machines; and
    initiate modification of the second one of the virtual machines in the virtualization environment responsive to detection of the first security condition with respect to the first one of the virtual machines,
      wherein the security coordinator initiates the modification independent of and prior to a response to the first security condition by the virtualization environment manager, prior to occurrence of a second security condition comprising a non-compliance with the second security policy for the second one of the virtual machines, and prior to detection of an attack on the second one of the virtual machines, wherein said modification comprises an increase in a level of the second security policy to be enforced for the second one of the virtual machines, and wherein the increase in the level of the second security policy to be enforced for the second one of the virtual machines comprises blocking access to resources of the second one of the virtual machines.

20. The system of claim 19, wherein the security coordinator is to receive security status information from the first one of the virtual machines and detect the first security condition with respect to the first one of the virtual machines responsive to receiving the security status information therefrom.

21. The system of claim 19, wherein, responsive to detection of the first security condition, the security coordinator is to distribute information regarding the noncompliance to the second one of the virtual machines.

22. The system of claim 19, wherein the security coordinator is to further detect an update to a global security policy for the plurality of virtual machines after initiating the modification of the second one of the virtual machines.

23. A computer program product for operating a computing system comprising a plurality of managed machines within a computing environment that is managed by an environment manager, the computer program product comprising:

a non-transitory computer readable storage medium having computer readable program code embodied in the medium, the computer readable program code comprising:

computer readable program code to detect a security condition with respect to a first one of the managed machines; and computer readable program code to initiate modification of a second one of the managed machines in the computing environment prior to a response to the security condition by the environment manager and responsive to detection of the security condition with respect to the first one of the managed machines, wherein said modification comprises an increase in a level of a security policy to be enforced for the second one of the managed machines, wherein the computer readable program code to initiate the modification of the second one of the managed machines comprises computer readable program code to determine, independent of the environment manager, to increase the level of the security policy of the second one of the managed machines, responsive to detection of the security condition with respect to the first one of the managed machines, wherein the modification of the second one of the managed machines is initiated independent of the environment manager, prior to occurrence of a second security condition with respect to the second one of the managed machines, and prior to detection of an attack on the second one of the managed machines, and wherein the increase in the level of the security policy to be enforced for the second one of the managed machines comprises blocking access to resources of the second one of the managed machines.

24. The system of claim 19, wherein a respective security policy of the security policies for the plurality of managed machines comprises a plurality of entries that define rules for observable events, actions that are performed responsive to occurrence of the observable events, or authorized users.

25. The computer system of claim 1 wherein the initiated modification of the second one of the managed machines in the computing environment is a first modification, wherein the security coordinator further initiates a second modification of a third one of the managed machines in the computing environment prior to the response to the security condition by the environment manager and responsive to detection of the security condition with respect to the first one of the managed machines, and wherein the first modification is different from the second modification.

26. The server system of claim 19 wherein the initiated modification of the second one of the virtual machines in the virtualization environment is a first modification, and wherein the security coordinator is further to:

receive a third security policy to be enforced for a third one of the virtual machines from the policy repository;

initiate a second modification of the third one of the virtual machines in the virtualization environment responsive to detection of the first security condition with respect to the first one of the virtual machines, wherein the security coordinator initiates the second modification independent of and prior to a response to the first security condition by the virtualization environment manager, prior to occurrence of a third security condition comprising a non-compliance with the third security policy for the third one of the virtual machines, and prior to detection of an attack on the third one of the virtual machines, wherein said second modification comprises an increase in a level of the third security policy to be enforced for the third one of the virtual machines, and wherein the increase in the level of the third security policy is different than the increase in the level of the second security policy.

* * * * *